United States Patent Office 2,855,000
Patented Oct. 7, 1958

2,855,000

REVERSE FLOW VALVE

Vincent K. Van Allen, Bridgeport, and David L. Morgan, Shelton, Conn., assignors to Robertshaw-Fulton Controls Company, Greensburg, Pa., a corporation of Delaware Application February 16, 1955, Serial No. 488,633

3 Claims. (Cl. 137—625.43)

This invention relates to reverse flow valves and more particularly to reverse flow four-way valves for use in refrigerating or air conditioning systems.

It has been customary in such devices to provide a rotary member rotatably mounted on a header having a plurality of parallel conduits therethrough. The rotary member is usually provided with ports which selectively interconnect the conduits as the rotary member is rotated. Although effective when used in low pressure applications, this arrangement has been found to be unsatisfactory when used in a high pressure application, such as a refrigerating system.

If the pressure within one of the conduits is high, it will tend to force the rotary member from the header, thus presenting a sealing problem. To overcome this, some devices permit the flow of high pressure fluid into a sealed chamber on the other side of the header. The high pressure fluid then tends to force the rotary member against the header. Although this arrangement eliminates the sealing problem, it has been found that rotation of the rotary member is more difficult due to the increased friction between the rotary member and the header. Therefore, it is an object of this invention to seal a rotary member when stationary and simultaneously facilitate rotation thereof.

Another object of this invention is to render the valve construction of a compact and simple nature with a minimum of moving parts.

In the preferred embodiment of this invention, a header having a plurality of conduits therethrough is fixed within a housing having a chamber therein. A rotary member within the chamber and rotatably mounted on the header has a plurality of ports which are adapted to selectively interconnect the conduits as the rotary member is rotated. A passageway is provided within the rotary member to establish communication between one of the ports and the chamber to normally maintain a fluid pressure within the chamber which tends to force the rotary member against the header. Means is provided to reduce the fluid pressure within the chamber during rotation of the rotary member.

Other objects and advantages will become apparent from the following specification taken in connection with the accompanying drawings wherein.

Figure 1:
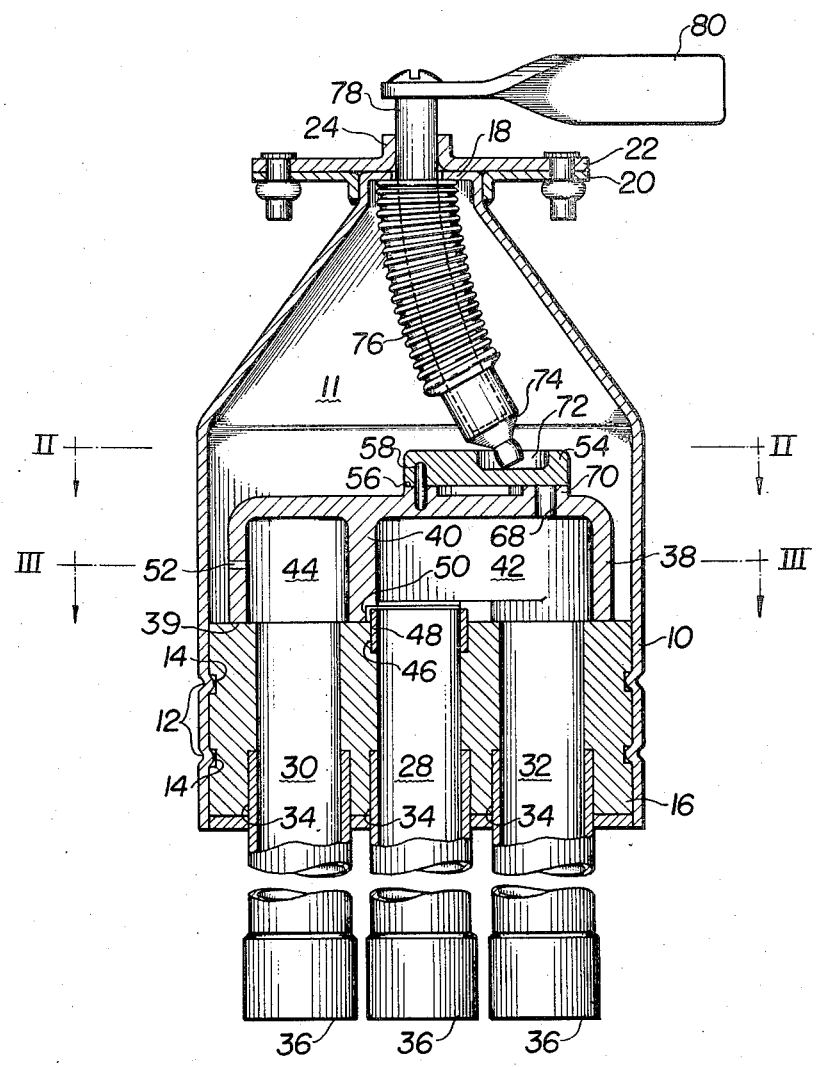
Fig. 1 is a front elevation partly in section of a reverse flow valve embodying this invention.
Figure 2:
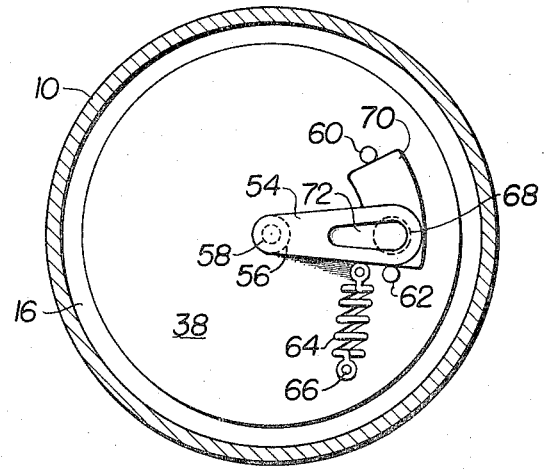
Fig. 2 is a section taken on the line II—II of Fig. 1.
Figure 3:
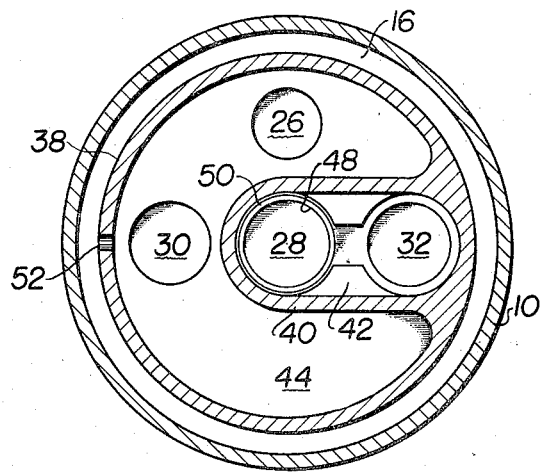
Fig. 3 is a section taken on the line III—III of Fig. 1.

Referring more particularly to the drawing, the reverse flow valve includes a hollow casing 10 of generally cylindrical configuration and having a conical shaped end portion defining a chamber 11 therein. The casing 10 is provided with two annular indentations 12, 12 in the wall thereof which are adapted to be received in two annular recesses 14, 14 in a wall of a header 16 later to be described.

The conical shaped end of the casing 10 is provided with a flanged end portion 18 carrying a flange 20 having a second flange 22 attached thereto and provided with an annular boss 24.

The header 16 is held in a fixed position in the lower end of the casing 10 by the annular indentations 12, 12 in the annular recesses 14, 14. A plurality, in this instance four parallel conduits 26, 28, 30 and 32 for fluid extend through the header 16. Each of the parallel conduits 26, 28, 30, 32 is provided with a recess 34 in the outer end thereof to receive a section of copper tubing 36 which enables each of the conduits 26, 28, 30, 32 to be connected to a system now to be described.

The conduits 26, 28 are adapted to be connected respectively by means of the tubing 36 to the high pressure (discharge) side and to the low pressure (suction) side of a compressor (not shown) in a refrigerating or air conditioning system. The conduits 30, 32 are adapted to be connected respectively by means of the tubing 36 to two heat exchangers (not shown) such as a condenser and evaporator in a refrigerating system. For the normal operation of the refrigerating system, conduits 26, 30 should be interconnected and conduits 28, 32 should be interconnected to allow flow of fluid from the discharge side of the compressor into conduit 26 and out conduit 30, through the two heat exchangers, into conduit 32, out conduit 28 and into the low pressure side of the compressor.

To interconnect the conduits 22, 28, 30, 32 as above described, a rotary valve member 38 is rotatably mounted on the top of the header 16. The rotary valve member 38 is of generally cylindrical configuration and has an end face 39, the end of which seats upon the top surface of the header 16. The mating surfaces of the header 16 and the end face 39 of the rotary valve member 38 are highly lapped surfaces to insure no leakage of fluid therebetween. A dividing wall 40 is formed within the rotary valve member 38 and defines two chambers 42, 44 within the rotary valve member 38. In the position shown, the chamber 42 envelopes the conduits 28, 32, and the chamber 44 which partially surrounds the chamber 42 envelopes the conduits 26, 30, thus the conduits 28, 32 and conduits 26, 30 are interconnected.

It will be noted that if the rotary valve member 38 is rotated 180°, the chamber 42 will interconnect the conduits 28, 30 and the chamber 44 will interconnect the conduits 26, 32, thus reversing the flow of fluid through the heat exchangers. To provide for rotation of the rotary valve member 38, a recess 46 is formed in the conduit 28 near the top of the header 16. A bushing 48 has a portion fixed within the recess 46 and a portion projecting from the header 16 which is slidably received in a recess 50 formed in the dividing wall 40. Thus, the header 16 is rotatable on the bushing 48 to selectively interconnect the conduits 26, 28, 30, 32.

It should now be noted that the high pressure fluid in the chamber 44 will tend to force the rotary member 38 away from the header 16 and that it is necessary to provide a force which tends to force the rotary valve member 38 toward the header 16 if leakage between their mating surfaces is to be prevented. To this end, a port 52 is provided in the wall of the rotary valve member 38 to allow communication between the chamber 44 and the chamber 11. Thus, flow of fluid is permitted from chamber 44 to chamber 11, and a fluid pressure is maintained in chamber 11 which is equal to the fluid pressure in chamber 44. However, it can be seen that fluid pressure in the chamber 11 acts on a larger area of the rotary valve member than does the fluid pressure within chamber 44, thus a resultant force is created which tends to force the rotary valve member 38 toward the header 16.

Although the pressure in the chamber 11 tends to force the rotary valve member 38 toward the header 16 and effect a seal between their mating surfaces, the friction between the mating surfaces is increased and manual rotation of the rotary valve member 38 would be difficult if the high pressure fluid were maintained in chamber 11 during rotation of the rotary valve member. To permit easier rotation of the rotary valve member 38, a means is provided which reduces the fluid pressure in the chamber 11 during rotation of the rotary valve member. An equalizing selector 54 is pivoted on a raised surface 56 of the rotary valve member 38 by a pin 58 and is free to rotate about the pin 58 between two stops 60, 62. The equalizing selector 54 is biased to the stop 62 by the spring 64 which has one end attached to a pin 66 projecting from the rotary valve member 38 and the opposite end fixed by a suitable means to the equalizing selector 54. The spring 64 mounted in tension between the equalizing selector 54 and the pin 66 normally holds the equalizing selector 54 in engagement with the stop 62. A port 68 is positioned on a curved raised surface 70 which is engaged by the free end of the equalizing selector 54 during rotation thereof. The port 68 is of larger diameter than the port 52 and extends through the wall of the rotary member 38 to establish communication between the chamber 11 and the chamber 42.

When the equalizing selector 54 is in engagement with the stop 62 as shown, it covers the port 68 and prevents flow of fluid therethrough. However, if the equalizing selector 54 is rotated counterclockwise to engage the stop 60, the port 68 will be uncovered and the pressure in the chamber 11 will cause fluid to flow through the port 68 and into the low pressure chamber 42. Since the port 68 is of larger diameter than port 52, the flow of fluid through port 68 will be greater and the pressure in the chamber will decrease reducing the force tending to force the rotary valve member 38 against the header 16 thus, effecting easier rotation of the rotary valve member 38.

The equalizing selector 54 is provided with a recess 72 in the top thereof which is adapted to receive an operating end 74 of a flexible bellows 76. The opposite end of the bellows 76 is attached to the flanged end portion 18 of the housing 10. Thus, the bellows 76 hermetically seals the chamber 11. A curved operating shaft 78 extends through the bushing 24 and into the bellows 76 to have one end in engagement with the inner side of the operating end 74. The opposite end of the shaft 78 extends exteriorly of the housing 10 to receive a manually rotatable knob 80. Rotation of the knob 80 will cause rotation of the curved shaft 78 and the operating end 74 of the flexible bellows 76.

When the operating shaft 78 is rotated, the equalizing selector 54 will be rotated until it engages the stop 60 uncovering the port 68, which permits flow of fluid from the chamber 11 into the chamber 42 to reduce the pressure forcing the rotary valve member 38 against the header 16. Since the equalizing selector 54 is in engagement with the stop 60, further rotation of the knob 80 causes the rotary valve member 38 to be rotated about the bushing 48. When the rotary valve member 38 has been thus rotated 180° the knob 80 is released and the spring 64 causes the equalizing selector 54 to rotate until it engages the stop 62 and covers the port 68 thus, allowing pressure to build up again in the chamber 11.

Operation

The conduit 26 and the conduit 28 are connected respectively to the high pressure (discharge) side and low pressure (suction) sides of a compressor in a refrigerating or air conditioning system by means of the tubing 36. The conduits 30, 32 are connected one each to the two heat exchangers (condenser and evaporator) by means of the tubing 36. In the position shown, fluid will flow from the compressor into the conduit 26 and the chamber 44, out the conduit 30, through the two heat exchangers, into the conduit 32 and the chamber 42 and back into the compressor by the conduit 28.

Should it be desired to reverse the flow through the two heat exchangers, the knob 80 is rotated counter-clockwise. Rotation of the knob 80 first rotates the equalizing selector 54 counter-clockwise until it engages the stop 60 decreasing the fluid pressure within the chamber 11 tending to force the rotary valve member 38 toward the header 16. Further rotation of the knob 80 causes the assembly of the rotary valve member 38, equalizing selector 54 and spring 64 to rotate about the bushing 48. When the rotary member has been rotated 180°, the knob 80 is released and the equalizing selector 54 is returned to its original position by the spring 64 to engage the stop 62. The chamber 42 now envelopes the conduits 28, 32 and the chamber 44 envelopes the conduits 30, 26. Thus, the flow through the heat exchangers is reversed.

It will be apparent that the device herein disclosed is not limited to use with refrigerating or air conditioning systems, but may easily be used with any pneumatic or hydraulic application requiring a flow reversing means. It will also be apparent that various changes may be made in the form and arrangement of parts and in the details of construction herein disclosed within the scope of the appended claims without departing from the spirit of the invention.

It is claimed and desired to secure by Letters Patent:

1. In a valve assembly having a casing provided with a plurality of ports, a valve disc mounted for axial rotation in said casing and having chambers for selectively connecting pairs of said ports, said valve disc having apertures establishing communication between said chambers for bypassing fluid therebetween, the combination of a valve seat on the valve disc offset from the axis thereof and through which one of the apertures extends, an auxiliary valve member pivotally mounted on the axis of the valve disc for slidable movement on said valve seat for controlling the bypass, a pair of stop means carried by the valve disc and alternatively engageable by said auxiliary valve member at the limits of said slidable movement, means for biasing said auxiliary valve member to one of said stop means for closing the bypass, and means operable for first moving said auxiliary valve member to the other said stop means for opening the bypass and thereafter rotating the valve disc.

2. In a valve assembly having a casing provided with a plurality of ports, a valve disc mounted for axial rotation in said casing and having chambers for selectively connecting pairs of said ports, said valve disc having apertures establishing communication between said chambers for bypassing fluid therebetween, the combination of an arcuate valve seat on the valve disc offset from the axis thereof and through which one of the apertures extends adjacent one end thereof, an auxiliary valve member pivotally mounted on the axis of the valve disc for slidable movement on said valve seat for controlling the bypass, a pair of stop means carried by the valve disc at each end of said valve seat respectively and being alternatively engageable by said auxiliary valve member at the limits of said slidable movement, means for biasing said auxiliary valve member to the one of said stop means at said one end of said valve seat for closing the bypass, and means operable for first moving said auxiliary valve member to the other said stop means for opening the bypass and thereafter rotating the valve disc.

3. The combination of claim 2 wherein the last said means includes a curved stem having one end rotatable about substantially the same axis as said auxiliary valve member and having the opposite end thereof overlying said auxiliary valve stem, a bellows enclosing said stem and having an operating portion engaging said valve member, and manually operable means for rotating said stem.

References Cited in the file of this patent

UNITED STATES PATENTS

| | | |
|---|---|---|
| 477,398 | Anderson | June 21, 1892 |
| 1,644,825 | Fulton | Oct. 11, 1927 |
| 1,971,187 | Jacobson | Aug. 21, 1934 |
| 2,202,960 | Parker | June 4, 1940 |
| 2,428,410 | Daniels | Oct. 7, 1947 |
| 2,659,569 | Ehlke | Nov. 17, 1953 |
| 2,758,811 | Peterson | Aug. 14, 1956 |